UNITED STATES PATENT OFFICE.

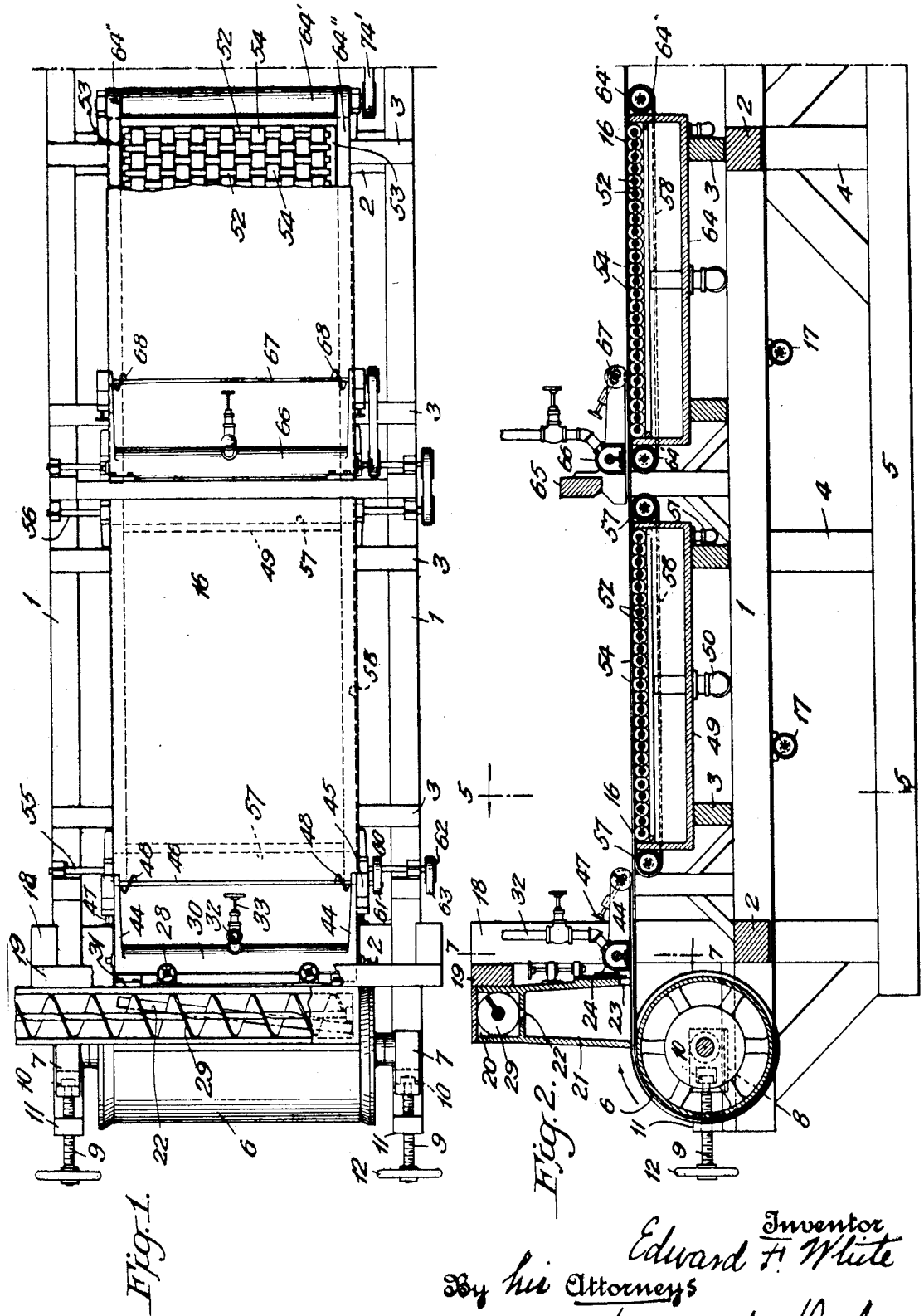

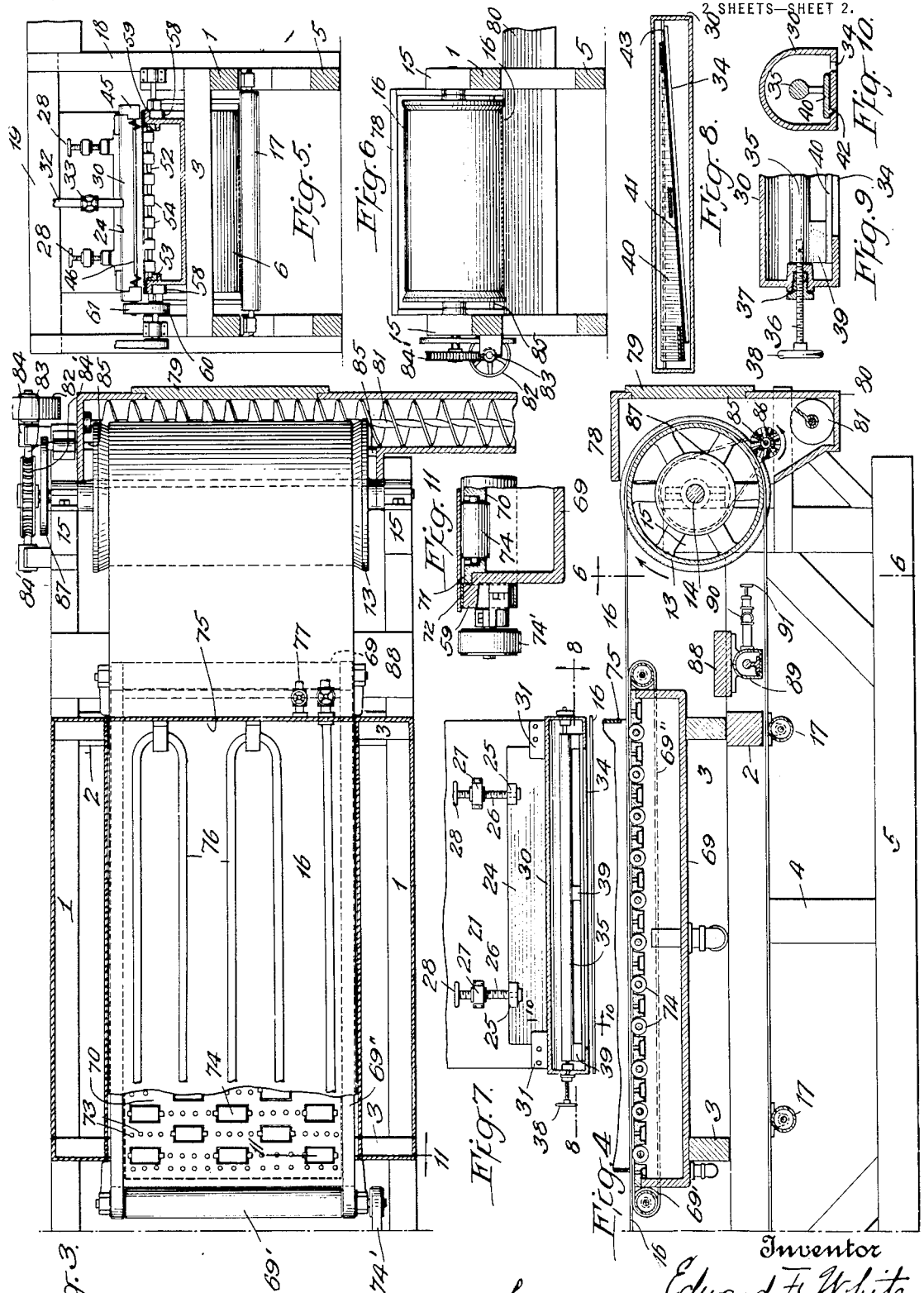

EDWARD F. WHITE, OF NEW YORK, N. Y.

PROCESS FOR PURIFYING SULFUR.

1,396,485.	Specification of Letters Patent.	Patented Nov. 8, 1921.

Application filed February 25, 1920. Serial No. 361,183.

*To all whom it may concern:*

Be it known that I, EDWARD F. WHITE, a citizen of the United States, and a resident of New York, in the county of Bronx and State of New York, have invented certain new and useful Improvements in Processes for Purifying Sulfur, of which the following is a specification.

My invention has for its object the purification of sulfur by an improved and novel method or process by means of which the purification is effected more quickly, thoroughly and at less cost than other methods or processes of which I have knowledge.

When sulfur is exposed to the atmosphere or to moisture it generates sulfurous acid and sometimes sulfuric acid due to the chemical reaction between the sulfur and the air or moisture, thereby unfitting it for many commercial purposes such, for instance, as in vulcanizing processes and it is for the purpose of removing the objectionable acid from the sulfur that I have devised my present invention.

Further objects and advantages of the invention will appear from the accompanying description, the invention consisting in the improved process hereinafter more particularly described and then specified in the claims.

In the accompanying drawings showing a practical embodiment of an improved apparatus by means of which my process may be practised:

Figure 1 is a plan view of the feed or forward end of the apparatus.

Fig. 2 is a horizontal central section taken through Fig. 1.

Fig. 3 is a plan view of the delivery or rear end of the apparatus.

Fig. 4 is a horizontal central section taken through Fig. 3.

Fig. 5 is a vertical cross-section on the line 5—5 of Fig. 2.

Fig. 6 is a vertical cross-section on the line 6—6 of Fig. 4.

Fig. 7 is a vertical cross-section on the line 7—7 of Fig. 2.

Fig. 8 is a horizontal section on the line 8—8 of Fig. 7.

Fig. 9 is an enlarged view of a portion of a neutralizing or alkaline solution chamber as shown in Fig. 7.

Fig. 10 is a vertical cross-section on the line 10—10 of Fig. 7.

Fig. 11 is a vertical cross-section on the line 11—11 of Fig. 3.

Referring more particularly to the several figures of the drawing:

1 indicates the longitudinal members of a framework adapted to support my improved apparatus, 2. transverse members connecting said longitudinal members and 3, tank-supporting members also connecting said longitudinal members. Said longitudinal members are connected by vertical supports 4 with base members 5. Mounted on the forward end of the frame intermediate the longitudinal members 1 is a drum 6 the shaft of which is journaled in suitable bearings 7 which are horizontally slidable in grooves or slots 8, said bearings being loosely connected to screw-threaded rods 9 by means of heads 10 on the ends of the rods 9 which bear against or engage the inner faces of a wall of the bearings through which the rods extend. Said rods 9 are supported by vertical flanges 11 connecting with the longitudinal members through which flanges they extend and they are provided on their ends with hand-wheels 12 the turning of which operates to adjust the horizontal position of the drum 6 in an obvious manner. Mounted on the opposite end of the frame intermediate the longitudinal members is a drum 13 whose shaft 14 is journaled in extensions 15 of said longitudinal members. 16 indicates an endless belt or carrier preferably made of a foraminous material, said belt extending over and around the drums 6 and 13 and over suitable idlers 17 which are journaled in bearings fastened to the under side of the longitudinal members. The belt may be slackened or tightened by operation of the hand-wheels 12 as is manifest.

18 indicates the side members of a frame jointed together by a transverse member 19, said side members being preferably fastened adjacent the drum 6 to the longitudinal members 1 and base members 5 of the framework. A hopper having an upper chamber 20 and a lower chamber 21 is fastened to the transverse member 19, said upper chamber being provided in the lower wall thereof with a diagonal slot 22 as indicated and the lower chamber being provided with a horizontal opening 23 at the bottom of the front wall and adjacent the endless belt or carrier 16. The size of said opening 23 may be regulated or adjusted by means of a vertically operating shutter 24 carrying ears 25 which receive the ends of screw-threaded rods 26, which rods extend through and are held by the interiorly-threaded bearings 27 fastened to the side of the hopper. (See Fig. 7.) Said rods terminate in hand-wheels 28 the operating of which effects the raising or lowering of the shutter 24 to vary, as desired, the width of the opening 23. Mounted in the upper chamber 20 of the hopper is a screw-conveyer 29 driven from any suitable source of power (not shown) the end of which is connected with a feed chamber or box (not shown) adapted to hold the powdered or granulated sulfur to be treated and purified.

30 indicates my improved neutralizing or alkaline solution chamber which is preferably fastened to the hopper by brackets 31. Said chamber is provided with an inlet pipe 32 having a valve 33 and is connected with a supply tank (not shown). Said chamber 31 is also provided with a diagonal slot 34 in the bottom wall thereof directly over the endless carrier 16. Horizontally slidably mounted in said chamber is a shaft 35 to which is connected a screw-threaded rod 36 extending through a stuffing box 37 and terminating in a hand-wheel 38. Connected to said shaft 35 by the members 39 is a flat plate 40 having an inclined or diagonal outer edge 41 parallel to the edge of the slot 34 in the base of the chamber. The plate 40 is also provided with a bead or ridge 42 interfitting with a horizontal groove 43 in the base of the chamber which acts as a guide for the plate. Obviously, a turning of the hand-wheel 38 effects a movement of the flat plate 40 bodily through the chamber 31 in the horizontal groove 43 and inasmuch as the edge 41 of the plate is parallel to the edge of the slot 34 the width of the slot may be varied as desired.

Fastened to the chamber 30 are the supporting arms 44 the ends of which carry bearings 45 having diagonal slots receiving the ends of a shaft 46. The ends of said shaft are connected with rods extending through the bearings and terminating in hand-wheels 47 the operating of which effects a raising or lowering of the shaft 46 to vary the distance thereof from the endless carrier 16 in an obvious manner. Said shaft 46 is also provided adjacent its ends with worms 48.

49 indicates a suction tank supported beneath the endless carrier on the tank-supporting members 3 of the framework. Said tank has connected therewith a suction pipe connected with a suitable vacuum pump (not shown) and a discharge or delivery pipe 51. Mounted within the tank are a plurality of shafts 52 whose ends are supported or journaled in suitable flanges 53 on the inner sides of the tank adjacent the top edges thereof. Said shafts 52 carry a plurality of rollers 54 interfitting with each other and engaging the under side of the endless carrier. Mounted in suitable bearings on the longitudinal members 1 of the framework are the shafts 55 and 56 carrying the rubber rollers 57 which engage the under side of the endless carrier and the ends of the tank 49. 58 indicates endless rubber belts passing over the ends of said rollers 57 and between the endless carrier and flanges 59 on the top edges of the sides of the tank which they engage (see Fig. 5). The shafts 52 and rollers 54, the endless carrier 16, the close engagement of the rubber rollers 57 with the endless carrier and the ends of the tank and the close engagement of the rubber belts 58 with the flanges 59 on the top edges of the sides of the tank and with the endless carrier normally operate to maintain a vacuum in the tank and to prevent air or moisture from entering therein except when drawn through the foraminous endless carrier by suction.

The said shaft 55 carries a pulley 60 frictionally engaging a pulley 61 carried on the end of shaft 46 as well as a driving wheel 62 connected by belt 63 with any suitable source of power so that the driving of wheel 62 operates to rotate shaft 46 and both the rubber rollers 57 as they are connected together by the rubber belts 58 as has been described.

64 indicates a second suction tank similar in configuration and construction to suction tank 49 and mounted in the same manner beneath the endless carrier as said first-named suction tank. Said tank 64 is provided with shafts 52 and rollers 54 mounted in the same manner as those previously described and with an outlet pipe and suction pipe. It also has associated therewith rubber rollers 64' at the ends thereof similar to the rubber rollers 57 and rubber belts 64" connecting said rollers similar to the rubber belts 58. Fastened to a transverse member 65 which is fastened to the framework and adjacent the forward end of the tank 64 is a water-chamber 66 similar in construction and operation to the neutralizing solution chamber 30 and having arms carrying an adjustable shaft 67 with worms 68 adjacent its ends. The shaft 67 and the shaft carrying the rubber roller adjacent the forward end of said tank are connected together and to the shaft 56 by pulleys and belts as clearly shown in Fig. 1 and which it is thought requires no detailed description.

69 indicates a third suction tank having an outlet pipe, a suction pipe, and rubber rollers 69' associated therewith and adjacent the ends thereof and rubber belts 69'' connecting said rollers, all similar in construction and mounted in the same manner as those previously described. As a modification of said invention I have substituted in said tank, however, for the shafts 52 and rollers 54 in the previous tanks, a plate 70 having flanges 71 adapted to rest on shoulders 72 on the side walls of the tank. Said plate is provided with perforations 73 therein and with rollers 74 suitably journaled in said plate. A pulley on the end of the shaft carrying the rubber roller 69' adjacent the forward end of said tank is connected by a belt 74' with a pulley on the end of the shaft carrying the rubber roller 64' adjacent the rear end of tank 64. Obviously, therefore, a rotating of the driving shaft 62 operates to rotate all of the rubber rollers (two for each tank) as well as the shafts 46 and 67. By preference I inclose the space directly above the tank 69 with a housing 75 forming an oven and provided with steam pipes 76 therein and having an air pipe 77.

78 indicates an inclosure mounted at the rear of the framework provided with a removable cover or door 79 so that access may be had thereto and with a trough or bottom 80 connecting with a delivery tank (not shown). Mounted in and extending through said trough is a screw-conveyer 81 which may be connected with any source of power.

82 indicates a main driving pulley connected with any source of power and having a worm-shaft 83 connected therewith and journaled in suitable bearings 84 connected to the framework at the delivery end thereof, said worm-shaft meshing with a worm-wheel 84' mounted on the end of the shaft 14 of the drum 13. 85 indicates a brush-shaft suitably journaled in bearings mounted on the longitudinal members 1, said brush-shaft carrying a brush 56 engaging the outer surface of the endless carrier 16. Said shaft 14 and brush-shaft 85 carry pulleys connected by a belt 87. Obviously the driving of the main shaft 14 effects a rotation of both drums and causes the endless carrier to travel therearound. It also causes the brush 86 to rotate.

Connecting the longitudinal members 1 of the framework is a cross-piece 88 to which is fastened or connected a water chamber 89 similar in construction to the chambers 30 and 66 and having a water pipe 90 and valve 91 connected therewith whereby a stream of water from said chamber may be directed against the inner surface of the endless carrier through which it will flow and thereby wash away any foreign substance on the outer surface of said carrier. If desired, a fourth suction tank similar in construction to the other three, may be supported beneath the carrier, in engagement therewith and in alinement with the water chamber 89, whereby the water and impurities are drawn through the carrier into said tank.

The operation of the apparatus and the practising of my improved process is as follows:

The sulfur to be purified is ground or pulverized to form minute particles so that it may be more easily and effectively treated and is placed in the feed box with which the screw-conveyer 29 is connected. The blades of said screw-conveyer draw the sulfur within the upper chamber 20 of the hopper and it falls through the diagonal slot 22 in the base thereof into the lower chamber 21 of said hopper, the diagonal slot acting in an obvious manner to distribute the sulfur evenly within said lower chamber. The sulfur banks within said lower chamber and is forced out of the opening 23 on to the endless, moving and foraminous carrier on which it is evenly distributed preferably in a thin layer. The thickness of the layer of sulfur on said belt may be varied to suit the convenience and in an obvious manner by regulating the size of the opening 23 by means of the shutter 24. The chamber is connected with a tank containing a suitable alkaline solution, as for instance sodium carbonate, which flows through the pipe 32 into the tank and is directed against or on the layer of sulfur on the endless carrier in a fine stream or sheet flowing through the diagonal slot 34 in said chamber 30. The quantity or amount of said solution flowing through said slot may be increased or diminished by varying the width of said slot by turning the hand-wheel 38 as has been described. Sufficient alkaline solution is permitted to flow through said slot to thoroughly saturate the particles of sulfur and the alkaline solution acts to neutralize the objectionable sulfurous acid and other impurities in the sulfur. Inasmuch as the sulfur is pulverized or ground into fine particles this neutralization of the sulfurous acid is effected more expeditiously and efficaciously than if the sulfur were treated as a solid mass. As the layer of sulfur passes under the shaft 46, the worms 48 at the ends thereof act to push the particles of sulfur inwardly toward the center of the belt and prevent them from falling off the sides thereof. When the sulfur passes over the suction tank 49 which is tightly closed at its top edges by means of the rubber rollers and the rubber belts as previously described and which is in effect a vacuum tank, the spent liquid is drawn by suction through the foraminous carrier and through the spaces intermediate the shafts 52 and rollers 54 into the suction tank from which it may be withdrawn when desired through the discharge pipe 51.

As the layer of sulfur passes beneath the water chamber 66 a stream or sheet of water from said chamber is directed against the sulfur to wash the same to free it of any foreign substances or impurities. The water with the impurities is then drawn by suction through the foraminous endless carrier into the suction tank 64 to leave the sulfur free of impurities and partially dry. As it passes under the shaft 67, the worms 68 at the ends thereof act to push the particles of the sulfur adjacent the sides of the carrier inwardly toward the center thereof as in the previous case.

When the sulfur passes over the suction tank 69 any moisture retained thereby is drawn by suction through the carrier and the perforations 73 and into the tank in the same manner as in the previous cases, the heated air in the oven or closure 75 through which the carrier passes materially aiding in the drying operation. As the carrier passes over the drum 13 the sulfur particles fall off into the trough 80 of the inclosure 78, the rotating brush 86 also assisting to remove any particles of sulfur tending to stick on the carrier. The screw-conveyer 81 then carries the sulfur which is now thoroughly purified and dry through the trough and into any suitable delivery tank. The carrier is then washed by a stream of water flowing from the water chamber 89 and directed against the inner surface of the carrier as has been described.

As is manifest, my improved apparatus is a continuously-operating and automatic one and requires no attention except an occasional emptying of the suction tanks, a filling of the feed box with the pulverized sulfur to be treated and an emptying of the delivery tank containing the purified sulfur.

What I claim as my invention is:

1. The herein described process of purifying sulfur consisting in pulverizing the same to form minute particles and treating said particles with an alkaline solution.

2. The herein described process of purifying sulfur consisting in pulverizing the same to form minute particles and directing a fine stream of an alkaline solution against the particles to saturate the same with the solution and to neutralize the impurities therein.

3. The herein described process of purifying sulfur consisting in treating the same with an alkaline solution to neutralize the impurities therein and drawing the spent solution from the sulfur by suction.

4. The herein described process of purifying sulfur consisting in pulverizing the same to form minute particles, directing a fine stream of an alkaline solution against the particles to saturate the same with the solution and to neutralize the impurities therein and drawing the spent solution from the particles of sulfur by suction to leave the sulfur free.

5. The herein described process of purifying sulfur consisting in placing the same on a foraminous support, treating the sulfur with an alkaline solution to neutralize the impurities therein and drawing the spent liquid from the sulfur through the foraminous support.

6. The herein described process of purifying sulfur consisting in treating the same with an alkaline solution to neutralize the impurities therein, drawing the spent liquid from the sulfur, washing the sulfur with water and drawing the water from the sulfur.

7. The herein described process of purifying sulfur consisting in pulverizing the same to form minute particles, directing a stream of an alkaline solution against the particles to neutralize the impurities therein, drawing the spent liquid from the particles, washing the particles with water, drawing the water from the particles and then drying the same.

8. The herein described process of purifying sulfur consisting in pulverizing the same to form minute particles, directing a stream of an alkaline solution against the particles to saturate the particles with the solution and neutralize the impurities therein, drawing the spent liquid from the particles by suction, directing a stream of water against the particles to wash the same, drawing the water from the particles by suction and drying the particles.

9. The herein described process of purifying sulfur consisting in spreading the same in a fine layer on a foraminous support, treating the sulfur with an alkaline solution to neutralize the impurities therein and permitting the spent liquid from the sulfur to flow through the foraminous support.

Signed at New York, in the county of New York and State of New York this 24th day of February, A. D. 1920.

EDWARD F. WHITE.

Witnesses:
F. B. TOWNSEND,
IRENE LEFKOWITZ.